(12) United States Patent
Ganesan et al.

(10) Patent No.: US 10,389,851 B2
(45) Date of Patent: Aug. 20, 2019

(54) PERFORMING POWER MANAGEMENT DURING A DOWNLOAD AND EXECUTE OPERATION

(71) Applicant: Intel Corporation, Santa Clara, CA (US)

(72) Inventors: Krishna Kumar Ganesan, Hillsboro, OR (US); Sudhakar Otturu, Portland, OR (US); Nicholas J. Adams, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 14/856,865

(22) Filed: Sep. 17, 2015

(65) Prior Publication Data

US 2017/0083305 A1 Mar. 23, 2017

(51) Int. Cl.
*G06F 1/00* (2006.01)
*G06F 1/26* (2006.01)
*H04L 29/08* (2006.01)
*G06F 21/57* (2013.01)
*G06F 1/3206* (2019.01)
(Continued)

(52) U.S. Cl.
CPC ............ *H04L 67/34* (2013.01); *G06F 1/3206* (2013.01); *G06F 8/654* (2018.02); *G06F 21/572* (2013.01); *H04L 63/126* (2013.01); *H04L 63/145* (2013.01); *H04W 52/0296* (2013.01); *G06F 1/3265* (2013.01); *G06F 1/3287* (2013.01); *Y02D 10/153* (2018.01); *Y02D 10/171* (2018.01); *Y02D 10/42* (2018.01); *Y02D 70/00* (2018.01); *Y02D 70/142* (2018.01);
(Continued)

(58) Field of Classification Search
None
See application file for complete search history.

(56) References Cited

U.S. PATENT DOCUMENTS

| 7,523,452 B1 | 4/2009 | Kamity et al. |
| 8,230,415 B1 * | 7/2012 | Thomas ................ G06F 21/57 717/168 |

(Continued)

FOREIGN PATENT DOCUMENTS

WO WO2015/065417 5/2015

OTHER PUBLICATIONS

International Searching Authority, "Notification of Transmittal of the International Search Report and the Written Opinion of the International Searching Authority," dated Nov. 24, 2016, in International application No. PCT/US2016/047997.

*Primary Examiner* — Nitin C Patel
(74) *Attorney, Agent, or Firm* — Trop, Pruner & Hu, P.C.

(57) ABSTRACT

In one embodiment, a system includes a display, a non-volatile memory to store one or more system software images, a processor to execute at least one of the one or more system software images, and a security engine to perform security applications. The security engine may include a first logic to receive a download package from a host computing system and store the download package in a first memory, authenticate the download package, and execute the download package to download and store a first system software image into the non-volatile memory. In addition, a second logic of the system may be configured to disable at least the display during the first system software image download and store. Other embodiments are described and claimed.

20 Claims, 5 Drawing Sheets

(51) Int. Cl.
  *H04L 29/06*    (2006.01)
  *H04W 52/02*   (2009.01)
  *G06F 8/654*    (2018.01)
  *G06F 1/3234*   (2019.01)
  *G06F 1/3287*   (2019.01)

(52) U.S. Cl.
  CPC .......... *Y02D 70/144* (2018.01); *Y02D 70/166* (2018.01); *Y02D 70/26* (2018.01)

(56) References Cited

U.S. PATENT DOCUMENTS

| | | |
|---|---|---|
| 2006/0117177 A1* | 6/2006 | Buer .................... G06F 21/606 713/155 |
| 2013/0109323 A1 | 5/2013 | Ruutu et al. |
| 2014/0344803 A1 | 11/2014 | Wang et al. |
| 2015/0067360 A1 | 3/2015 | DeHaan |
| 2015/0095666 A1 | 4/2015 | Ananthakrishnan et al. |
| 2015/0347117 A1* | 12/2015 | Tokunaga ............... H04L 67/02 717/173 |

* cited by examiner

PERFORMING POWER MANAGEMENT DURING A DOWNLOAD AND EXECUTE OPERATION

TECHNICAL FIELD

Embodiments relate to power management of a computing system.

BACKGROUND

With the introduction of block-based firmware storage devices, historically relevant provisioning and recovery mechanisms for firmware, basic input output system (BIOS), and operating systems (OSs) are no longer sufficient. Techniques are being developed to provide new manners of provisioning and recovery. However, these techniques may incur long periods of time, which can have deleterious effects on a battery-powered system.

DETAILED DESCRIPTION

A download and execute (DnX) can be performed by a combination of components including firmware, basic input/output system (BIOS), and operating system (OS). In one example, a DnX enables a converged security engine (CSE), also referred to herein as a security engine or secure element (SE), of a system to download a DnX module, e.g., over a Universal Serial Bus (USB) 2.0 connection, from a host system without any other firmware being present on a target system. The SE is then able to authenticate and execute the module. Additionally, a DnX operation can be used with up to USB3.0 speeds for OS provisioning after the BIOS has executed and memory is initialized. This feature may be used to provision system firmware, and also diagnose issues with corruption or to recover an OS image.

DnX operations may be performed in many different platform types, from wearables to smartphones to client personal computers (PCs). DnX usage models thus may extend from manufacturing sites, to original equipment manufacturer (OEM) refurbishing centers, and even to end consumers. In some cases a target platform may not be provided with AC power during a download. This is because some platforms only have a single USB connection that is used for both power delivery and a DnX data connection. As such, these platforms may perform the entire DnX process using battery power only. For small form factors with limited battery life such as smartphones and wearable systems, large DnX updates such as complete OS provisioning may be at risk. During manufacturing or refurbishing, significant time can be wasted if the battery is not able to power the device long enough to provision large content blocks. This process can take from a few minutes to hours, depending on computing speed and storage media. Any failure during a DnX operation may cause a restart of this potentially lengthy process. Embodiments may provide power policy management during a DnX operation, which can greatly enhance battery life and hence the reliability of DnX, e.g., during platform manufacturing.

Embodiments may save significant amounts of power during a DnX operation. As such, embodiments enable power reduction, e.g., during firmware and OS provisioning flows. In this way, the amount of time that a platform is able to survive on battery power during a provisioning process can be extended. This increased battery life can be used to simplify a manufacturing process by not maintaining the platform to be powered as often during the process. It also can allow for more time during and between manufacturing steps. Overall this provides for a more robust manufacturing environment with less risk of platforms requiring to be re-provisioned due to device power failures.

On a typical DnX flow, secure element firmware signals BIOS via a payload data structure. In an embodiment, this payload data structure may be stored in shared memory such as static random access memory (SRAM), along with a DnX trigger message. In turn, the BIOS enters a DnX flow when a valid trigger is present. There are many factors that can trigger a DnX operation, including triggers generated by a peripheral controller hub or a processor such as a system on chip (SoC). Non-limiting examples include a corrupted OS boot loader, a corrupted OS, or an explicit user-invoked event. In these cases, the BIOS receives the request and executes the DnX flow.

Embodiments may be used to generate and apply selective power policy management during a DnX flow, to increase overall system reliability. In different embodiments, non-essential components of a platform (including intellectual property (IP) blocks within a processor or other SoC) can be prevented from using significant (or any) power during the update process. For example, displays are often a significant power consumer during an active state. However, typically nothing is needed to be displayed during DnX operation, as another visual or human-perceptible indicator that operates at lower power than a display, such as a light emitting diode (LED), can be used to indicate progress. If during the DnX operation an error occurs, the power management policy can provide for the display and/or any other implicated devices to resume, enabling error reporting.

In an embodiment, power management flows can be embedded within a DnX process to improve reliability and robustness. When there is a DnX trigger for an OS DnX operation, the SE sets an OS DnX flag bit set in the payload structure, which is then consumed by BIOS. In an embodiment, when BIOS detects the OS DnX request, it installs the DnX power policy manager during that boot and may also set a BIOS boot mode to indicate a DnX boot mode. In an embodiment, the DnX power policy manager may be configured to ensure optimal power usage during a given DnX flow by enabling only boot-critical devices and only required IP blocks of one or more processors for the DnX operation. Once the DnX operation is complete, the system may enter, e.g., via a reset, into a normal boot mode in which the DnX power policy manager is not activated.

In an example embodiment, the following subsystems may be optimal targets to be powered off or placed into a low power mode during OS DnX operation: one or more graphics devices, such as a graphics processing unit (GPU) and related IP blocks; one or more wide area network/Wi-Fi communication devices and related IP blocks; one or more short range communication devices such as Bluetooth or other near field communication (NFC) devices; an infrared (IR) device and related IP blocks; camera devices and related IP blocks; and storage devices, other than a target storage device. For example, if an OS is to be downloaded in a DnX operation to a solid state drive (SSD), other storages connected to the system such as a memory card, a universal flash storage, and so forth, can be power gated.

Figure 1:
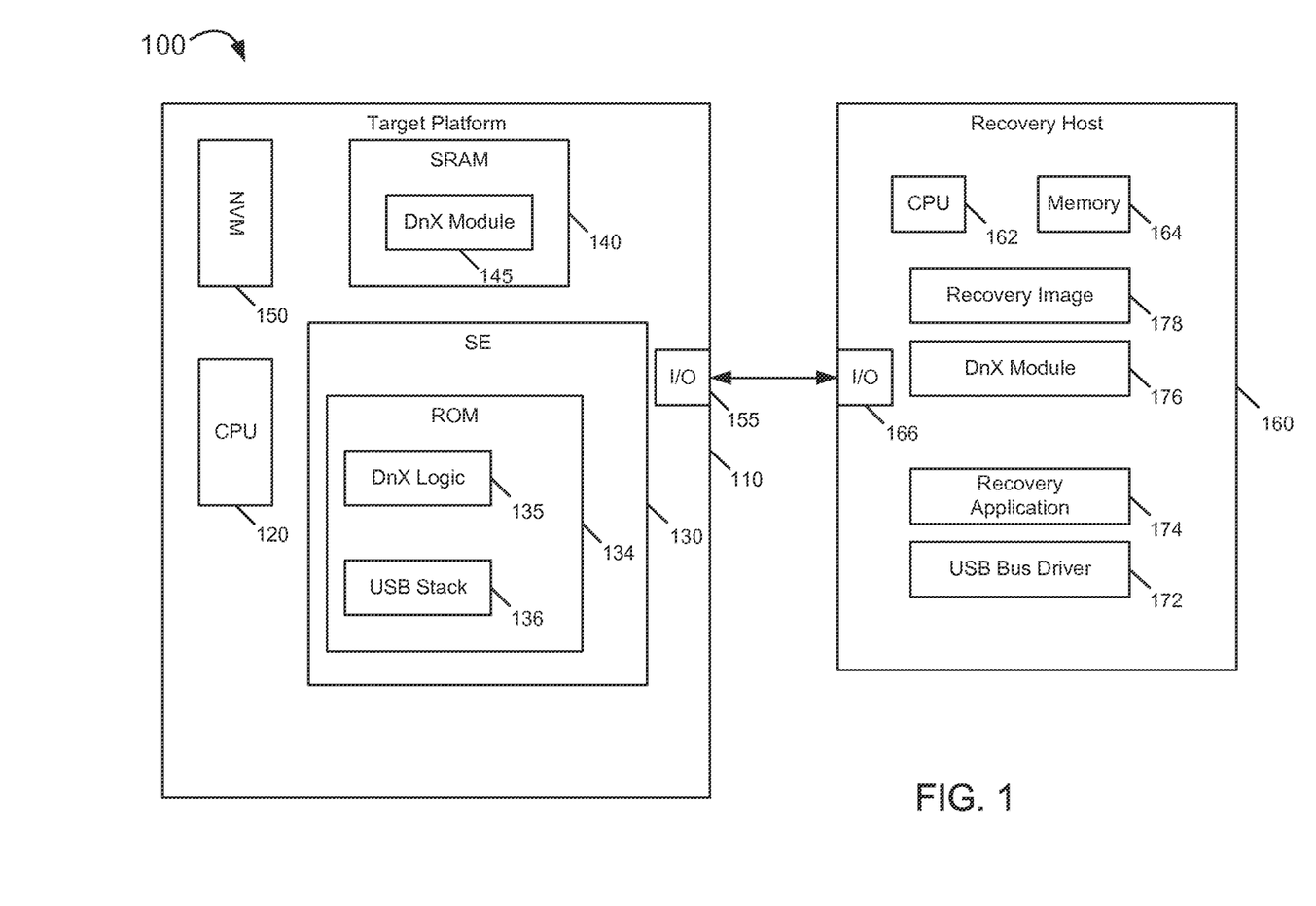
FIG. 1 is an arrangement of multiple computing systems for performing DnX operations in accordance with an embodiment of the present invention.

Referring now to FIG. 1, shown is an arrangement of multiple computing systems for performing DnX operations as described herein. In the illustration of FIG. 1, architecture 100 includes a target computing system 110, also referred to herein as a target platform, that couples by way of one or more wired and/or wireless connections to a second computing system 160, also referred to herein as a recovery host. In various embodiments, recovery host 160 may provide a download package. This download package may have a DnX module that includes code to perform a download operation, which when executed, enables target computing system 110 to download and store to a destination storage a system software image, such as an OS, firmware, BIOS or other system-level software.

As illustrated, target platform 110 may take the form of any type of computing system, ranging from a small portable device such as smartphone, tablet computer, notebook computer or so forth to a client computing system such as a desktop computer. Target computing system 110 includes a central processing unit (CPU) 120, which in an embodiment may be a multi-core processor. Coupled to CPU 120 is a secure element 130, which in one embodiment may be a separate integrated circuit. In other cases, secure element 130 may be implemented as a separate logic circuit within CPU 120, such as a converged security engine (CSE). Security engine 130 itself may include various constituent logic circuits each configured to perform one or more given security functions, including DnX operations as described herein. In the illustration shown, security engine 130 includes a read only memory (ROM) 135 that in turn includes a USB stack 136 and a DnX logic 135, both of which may be used in performing DnX operations as described herein.

As further illustrated, a given memory of target platform 110, here shown as a static random access memory (SRAM) 140, which may be a standalone memory device or may be memory internal to security element 130 (or CPU 120), may act as an intermediary storage device to store a given binary image that in turn are provided to a final destination storage, which as shown in the embodiment of FIG. 1 is a nonvolatile memory 150. For illustration, SRAM 140 is shown to include a DnX module 145 after download from recovery host 160. Target platform 110 further includes an input/output (I/O) circuit 155, which in an embodiment may provide an interface according to one or more communication protocols, including a USB protocol in this case where the devices are coupled via a USB communication.

Now with reference to recovery host 160, various hardware is present, including a CPU 162, a memory 164, and an I/O circuit 166. These various components may perform DnX operations via various combinations of hardware, software and/or firmware of system 160 including, in the embodiment shown, a USB bus driver 172, a recovery application 174, a DnX module 176, and a recovery image 178. Understand while shown at this high level in the embodiment of FIG. 1, many variations and alternatives are possible.

At a high level, a DnX operation may be initiated responsive to a DnX trigger, which in an embodiment may be caused by coupling of target computing device 110 to recovery host 160. In embodiments, this coupling may be via a wired or wireless connection. In typical embodiments, a connection may be a USB connection, which causes DnX logic 135 of secure element 130 to enter into DnX mode. Thereafter, a USB port of I/O circuit 155 is enumerated via USB stack 136 and a USB connection is established between the two systems. DnX logic 135 then may establish a connection with recovery application 174, and download and authenticate DnX module 176 from recovery application 174, e.g., while the module is stored in SRAM 140. Once authenticated, control is transferred to DnX module 145, which may be executed on secure element 130. During execution, a recovery image 178 may be downloaded, along with a manifest and loaded into destination storage 150. Thereafter, the image can be authenticated, and if successful it can then be executed. As will be described further, not all components of target platform 110 are active in this DnX operation, and such unused devices can be power managed as described herein.

Figure 2:
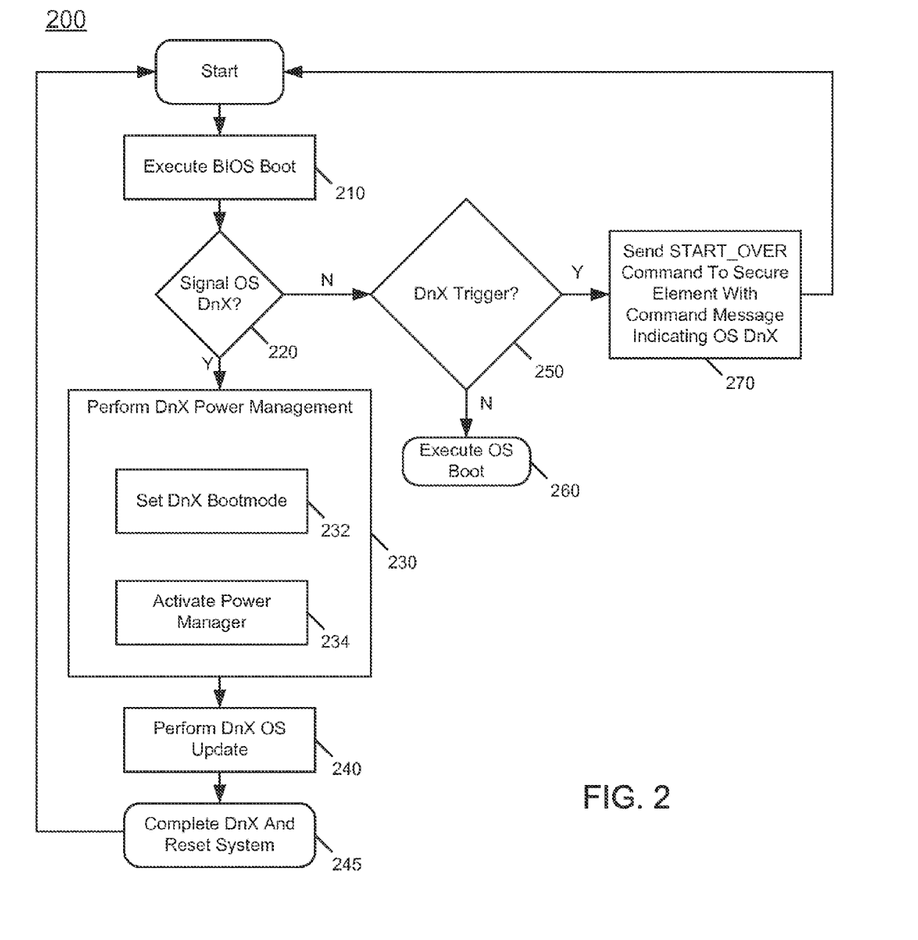
FIG. 2 is a flow diagram of a method in accordance of an embodiment of the present invention.

Referring now to FIG. 2, shown is a flow diagram of a method in accordance of an embodiment of the present invention. In various embodiments, method 200 may be performed by appropriate combinations of hardware circuitry, software and/or firmware. In some embodiments, portions of method 200 may be performed within a security logic of a processor such as a separate component of a general-purpose microprocessor or a separate security engine and also within BIOS or other system firmware within a system. In the embodiment of FIG. 2, method 200 may begin upon boot of the secure element.

This boot of the secure element may be performed on system reset and before entry into a firmware boot of the system. As illustrated, after this secure element boots via its firmware, method 200 continues by causing a BIOS firmware boot to execute (block 210). Then it may be determined whether an OS DnX is signaled (diamond 220). Understand while this is one type of trigger signal, in other cases trigger signals for other types of DnX operations, including firmware, BIOS or other system software image DnXs, may instead occur. Thus while described in the context of an OS DnX, understand similar methods may be used to perform a DnX for another type of image. If such DnX is signaled, control passes to block 230, where DnX power management may be performed. In an embodiment, such management includes setting of a DnX boot mode (block 232). In an embodiment, this boot mode may be an Extensible Firmware Interface (EFI) standard interface to indicate BIOS boot mode, such as S3, S4, recovery, DnX, or so forth. Thereafter a power manager for the DnX may be installed and activated (block 234).

In an embodiment, this power manager may be executed within BIOS and may perform power management according to a DnX power policy, which itself may be stored in BIOS. In an embodiment, to effect various power management operations, the power manager can communicate directly (e.g., via appropriate BIOS calls) with affected components (which may be various components within the system), as described herein to cause these devices to be powered off or placed into an appropriate low power mode (e.g., with the depth of low power state dependent on expected duration of the DnX operation). Or in other cases, this power manager may communicate with an overall power manager of the computing system, such as a power management integrated circuit (PMIC) that in turn may effect the requested power management operations. Still further, processor-internal power management can also be effected, e.g., via a power control unit (PCU) of the processor based on this power manager control. In yet other cases, a hybrid approach between any of these approaches may occur.

After establishing and executing the active power manager, control passes next to block 240 where the DnX update process may be performed, namely the initial receipt of a download package that in turn is executed to enable a given image (an OS image in the embodiment of FIG. 2) to be downloaded and stored in the appropriate destination storage. At block 245, on completion of the DnX operation, the system may be reset, and the secure element is again booted such that method 200 may begin again, now presumably leading to an OS boot.

Still with reference to FIG. 2, if instead an OS DnX is not signaled as determined at diamond 220, control passes to diamond 250 to determine whether another DnX trigger has occurred. Although the scope of the present invention is not limited in this regard, such DnX triggers may include any of the following: a corrupted OS loader; a corrupted OS; and/or a forced user DnX. If no such trigger occurs, control passes to block 260 where a normal OS boot may occur. Otherwise if any DnX trigger has occurred, control passes to block 270, where a start over command is sent to the secure element. This command message may indicate the DnX operation to occur. As such, another boot of the secure element may begin and method 200 may be performed to enable the DnX update to occur. Understand while shown at this high level in the embodiment of FIG. 2, many variations and alternatives are possible.

Figure 3:
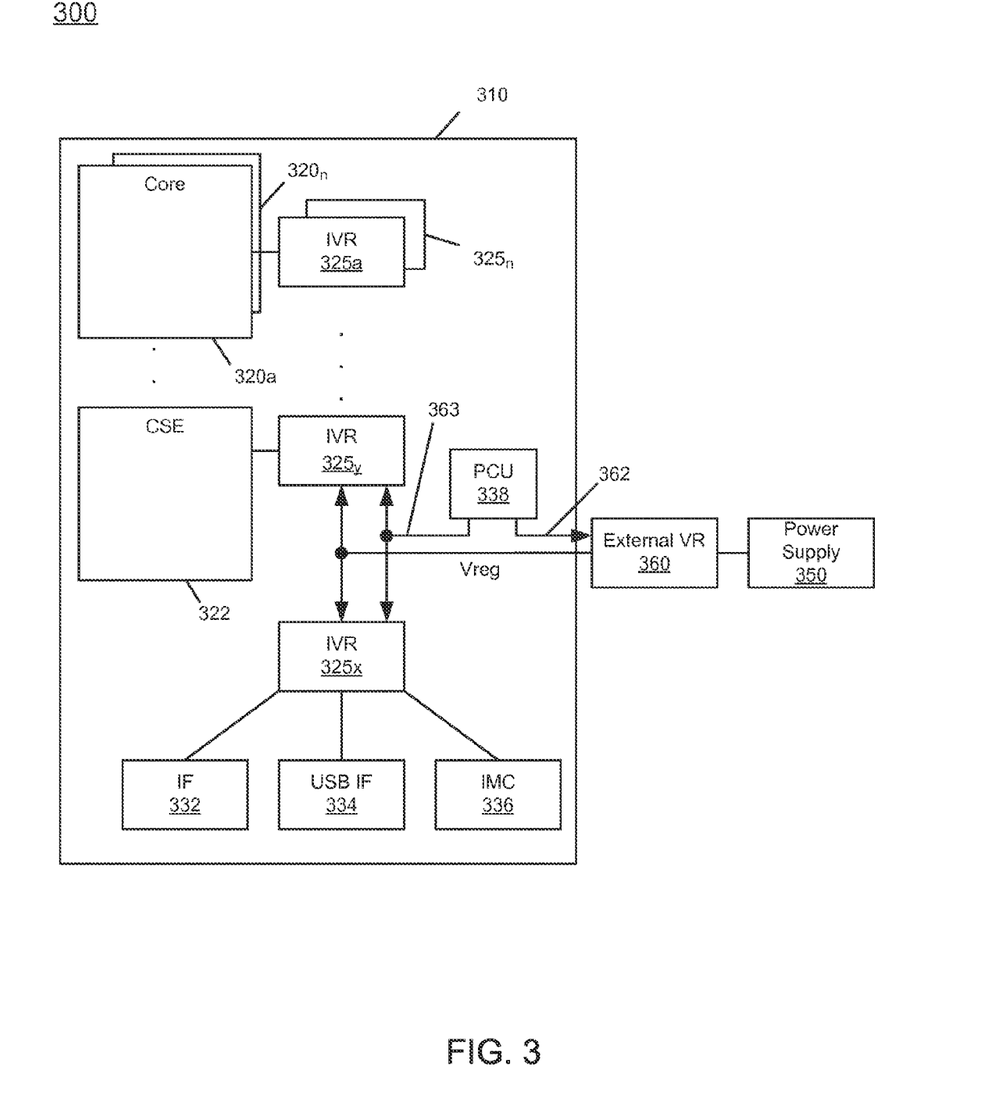
FIG. 3 is a block diagram of a portion of a system in accordance with an embodiment of the present invention.

Referring now to FIG. 3, shown is a block diagram of a portion of a system in accordance with an embodiment of the present invention. As shown in FIG. 3, system 300 may be a given target platform having various components, including a processor 310 which as shown is a multicore processor. Processor 310 may be coupled to a power supply 350 via an external voltage regulator 360, which may perform a first voltage conversion to provide a primary regulated voltage Vreg to processor 310.

As seen, processor 310 may be a single die processor including multiple cores 320a-320n. In addition, each core may be associated with an integrated voltage regulator (IVR) 325a-325n which receives the primary regulated voltage and generates an operating voltage to be provided to one or more agents of the processor associated with the IVR. Accordingly, an IVR implementation may be provided to independent control of voltage and performance of each individual agent. As such, each core can operate at an independent voltage and frequency, enabling great flexibility and affording wide opportunities for balancing power consumption with performance. During power management, a given power plane of one IVR may be powered down or off when the processor is placed into a certain low power state, while another power plane of another IVR remains active, or fully powered. A CSE 322 is also present to perform security operations and which may be powered by a separate IVR 125y.

Still referring to FIG. 3, additional components may be present within the processor including an input/output interface (IF) 332, another interface 334, and an integrated memory controller (IMC) 336. As seen, each of these components may be powered by another integrated voltage regulator 325ₓ. In one embodiment, interface 332 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 334 may communicate via a USB protocol.

Also shown is a power control unit (PCU) 338, which may include circuitry including hardware, software and/or firmware to perform power management operations with regard to processor 310. As seen, PCU 338 provides control information to external voltage regulator 360 via a digital interface 362 to cause the voltage regulator to generate the appropriate regulated voltage. PCU 338 also provides control information to IVRs 325 via another digital interface 363 to control the operating voltage generated (or to cause a corresponding IVR to be disabled in a low power mode). In various embodiments, PCU 338 may receive instructions from a DnX power manager and control power management within the processor during DnX operations as described herein.

Figure 4:
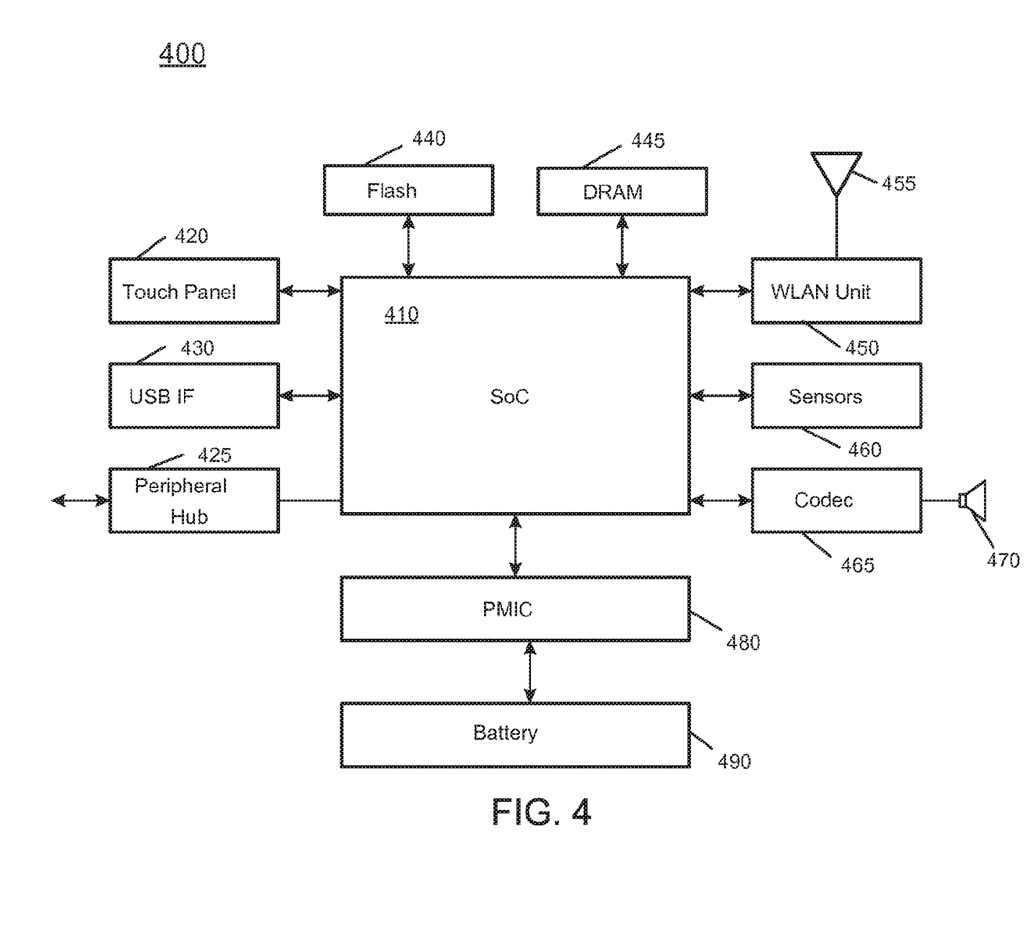
FIG. 4 is a block diagram of another example system with which embodiments may be used.

Referring now to FIG. 4, shown is a block diagram of another example system with which embodiments may be used. In the illustration of FIG. 4, system 400 may be mobile low-power system such as a tablet computer, 2:1 tablet, phablet or other convertible or standalone tablet system. As illustrated, a SoC 410 is present and may be configured to operate as an application processor for the device. SoC 410 may include a CSE and a power manager logic to perform management operations during DnX operation as described herein, such as by way of powering down one or more components (including unused components within SoC 410) during a DnX operation.

A variety of devices may couple to SoC 410. In the illustration shown, a memory subsystem includes a flash memory 440 and a DRAM 445 coupled to SoC 410. In addition, a touch panel 420 is coupled to the SoC 410 to provide display capability and user input via touch, including provision of a virtual keyboard on a display of touch panel 420. To provide wired network connectivity, SoC 410 couples to an USB interface 430 (which may typically provide power, but not during a DnX operation in which a DnX package is sent via USB). A peripheral hub 425 is coupled to SoC 410 to enable interfacing with various peripheral devices, such as may be coupled to system 400 by any of various ports or other connectors.

In addition to internal power management circuitry and functionality within SoC 410, a PMIC 480 is coupled to SoC 410 to provide platform-based power management, e.g., based on whether the system is powered by a battery 490 or available USB power. In addition to this power source-based power management, PMIC 480 may further perform platform power management activities based on environmental and usage conditions. Still further, PMIC 480 may communicate control and status information to SoC 410 to cause various power management actions within SoC 410. In some embodiments, the power management logic may instruct PMIC 480 to perform certain platform power management activities during a DnX operation.

Still referring to FIG. 4, to provide for wireless capabilities, a WLAN unit 450 is coupled to SoC 410 and in turn to an antenna 455. In various implementations, WLAN unit 450 may provide for communication according to one or more wireless protocols.

As further illustrated, a plurality of sensors 460 may couple to SoC 410. These sensors may include various accelerometer, environmental and other sensors, including user gesture sensors. Finally, an audio codec 465 is coupled to SoC 410 to provide an interface to an audio output device 470. Of course understand that while shown with this particular implementation in FIG. 4, many variations and alternatives are possible.

Figure 5:
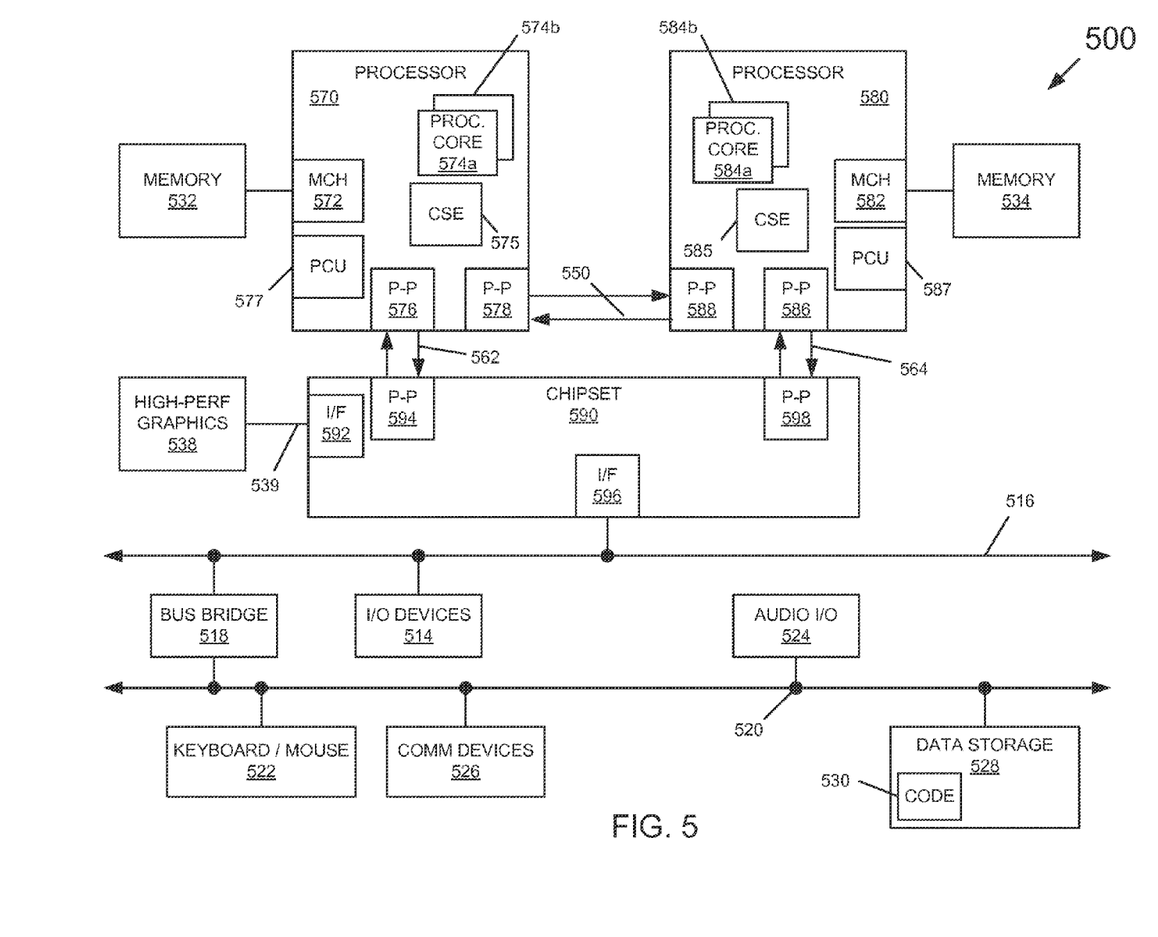
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. Each of the processors includes a CSE 575 and 585, and a PCU 577 and 587 and/or other power management logic (including BIOS power management logic) to perform the power management as described herein during DnX operations.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 562 and 564, respectively. As shown in FIG. 5, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, tablet computer, netbook, Ultrabook™, or so forth.

The following examples pertain to further embodiments.

In one example, a system comprises: a display; a non-volatile memory to store one or more system software images; a processor to execute at least one of the one or more system software images; and a security engine to perform security applications. The security engine may include a first logic to receive a download package from a host computing system and store the download package in a first memory, authenticate the download package, and execute the download package to download and store a first system software image into the non-volatile memory. The system may further include a second logic to disable at least the display during the first system software image download and store.

In an example, the second logic is to access a power policy to determine a plurality of devices of the system to be disabled during the first system software image download and store.

In an example, the plurality of devices comprises non-boot critical devices of the system.

In an example, the system further includes a storage to store the power policy.

In an example, the system comprises a battery-powered computing device having a rechargeable battery, the rechargeable battery to be charged via a USB port, where the first system software image download is to occur via the USB port.

In an example, the second logic is to disable the processor during the first system software image download and store and enable the processor after the first system software image download and store.

In an example, responsive to a trigger signal received during a boot of the security engine, the first logic is to initiate a request for the download package.

In an example, the first logic is to reset the system after the first system software image download and store.

In an example, the first system software image comprises a manifest and an operating system OS.

In an example, the processor includes the security engine.

In another example, a method comprises: responsive to a trigger signal, establishing a connection between a download logic of a security engine of a target computing system and a host application of a host computing system; establishing a power manager to control power consumption of the target computing system during a download and execute operation; and disabling, via the power manager, at least one device of the target computing system, where the at least one device is not involved in the download and execute operation.

In an example, the method includes accessing a power policy of the power manager to determine the at least one device to disable.

In an example, the at least one device comprises a display.

In an example, the method further includes identifying the trigger signal during a boot of the security engine.

In an example, the connection comprises a USB connection, where the target computing system comprises a battery-powered device to receive power via a USB port of the USB connection.

In an example, the method includes performing a boot of the security element and thereafter causing a firmware boot to be performed. The firmware boot may issue the trigger signal responsive to one of a corrupted operating system, a user-initiated event, and a coupling of the target computing system to the host computing system, as examples.

In another example, a method comprises: responsive to a trigger signal, establishing a connection between a security engine of a target computing system and a host application of a host computing system; installing a power manager in the target computing system to control power consumption of the target computing system during a download and execute operation; disabling, via the power manager, at least one device of the target computing system, where the at least one device is not involved in the download and execute operation; and performing the download and execute operation. This operation may include downloading a first package into a first storage of the target computing system and executing the first package in the security engine to cause a system software image to be downloaded to a second storage of the target computing system, while the at least one device is disabled.

In an example, the method further comprises accessing a power policy of the power manager to determine the at least one device to disable.

In an example, the method further comprises disabling a processor of the target computing system during the system software image downloading and storing, and enabling the processor after the system software image is downloaded to the second storage.

In an example, the method further comprises responsive to an error during the system software image downloading, enabling a display of the target computing system to report the error, the at least one device comprising the display.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a display;
a non-volatile memory to store one or more system software images;
a processor to execute at least one of the one or more system software images;
a security engine to perform security applications, the security engine including a first logic to receive a download package from a host computing system and store the download package in a first memory, authenticate the download package, and execute the download package to download and store a first system software image into the non-volatile memory; and
a second logic to disable at least the display during the first system software image download and store.

2. The system of claim 1, wherein the second logic is to access a power policy to determine a plurality of devices of the system to be disabled during the first system software image download and store.

3. The system of claim 2, wherein the plurality of devices comprises non-boot critical devices of the system.

4. The system of claim 2, further comprising a storage to store the power policy.

5. The system of claim 1, wherein the system comprises a battery-powered computing device having a rechargeable battery, the rechargeable battery to be charged via a universal serial bus (USB) port, wherein the first system software image download is to occur via the USB port.

6. The system of claim 2, wherein the second logic is to disable the processor during the first system software image download and store and enable the processor after the first system software image download and store, the processor comprising a plurality of cores.

7. The system of claim 2, wherein, responsive to a trigger signal received during a boot of the security engine, the first logic is to initiate a request for the download package from the host computing system.

8. The system of claim 1, wherein the first logic is to reset the system after the first system software image download and store.

9. The system of claim 1, wherein the first system software image comprises a manifest and an operating system (OS).

10. The system of claim 1, wherein the processor comprises the security engine.

11. At least one non-transitory computer readable storage medium comprising instructions that when executed enable a system to:
responsive to a trigger signal, establish a connection between a download logic of a security engine of a target computing system and a host application of a host computing system;
establish a power manager to control power consumption of the target computing system during a download and execute operation; and
disable, via the power manager, at least one device of the target computing system, the at least one device not involved in the download and execute operation.

12. The at least one non-transitory computer readable storage medium of claim 11, further comprising instructions that when executed enable the system to access a power policy of the power manager to determine the at least one device to disable.

13. The at least one non-transitory computer readable storage medium of claim 12, wherein the at least one device comprises a display.

14. The at least one non-transitory computer readable storage medium of claim 11, further comprising instructions that when executed enable the system to identify the trigger signal during a boot of the security engine.

15. The at least one non-transitory computer readable storage medium of claim 11, wherein the connection comprises a universal serial bus (USB) connection, and wherein the target computing system comprises a battery-powered device to receive power via a USB port of the USB connection.

16. The at least one non-transitory computer readable storage medium of claim 11, further comprising instructions that when executed enable the system to perform a boot of the security engine and thereafter cause a firmware boot to be performed, the firmware boot to issue the trigger signal responsive to one of a corrupted operating system, a user-initiated event, and a coupling of the target computing system to the host computing system.

17. A method comprising:
responsive to a trigger signal, establishing a connection between a security engine of a target computing system and a host application of a host computing system;
installing a power manager in the target computing system to control power consumption of the target computing system during a download and execute operation;
disabling, via the power manager, at least one device of the target computing system, the at least one device not involved in the download and execute operation; and
performing the download and execute operation, including downloading a first package into a first storage of the target computing system and executing the first package in the security engine to cause a system software image to be downloaded to a second storage of the target computing system, while the at least one device is disabled.

18. The method of claim 17, further comprising accessing a power policy of the power manager to determine the at least one device to disable.

19. The method of claim 17, further comprising disabling a processor of the target computing system during the system software image downloading and storing and enabling the processor after the system software image is downloaded to the second storage.

20. The method of claim 17, further comprising responsive to an error during the system software image downloading, enabling a display of the target computing system to report the error, the at least one device comprising the display.

* * * * *